3,331,119
METHOD AND APPARATUS FOR SECURING A CONTACT TO A SUPPORT

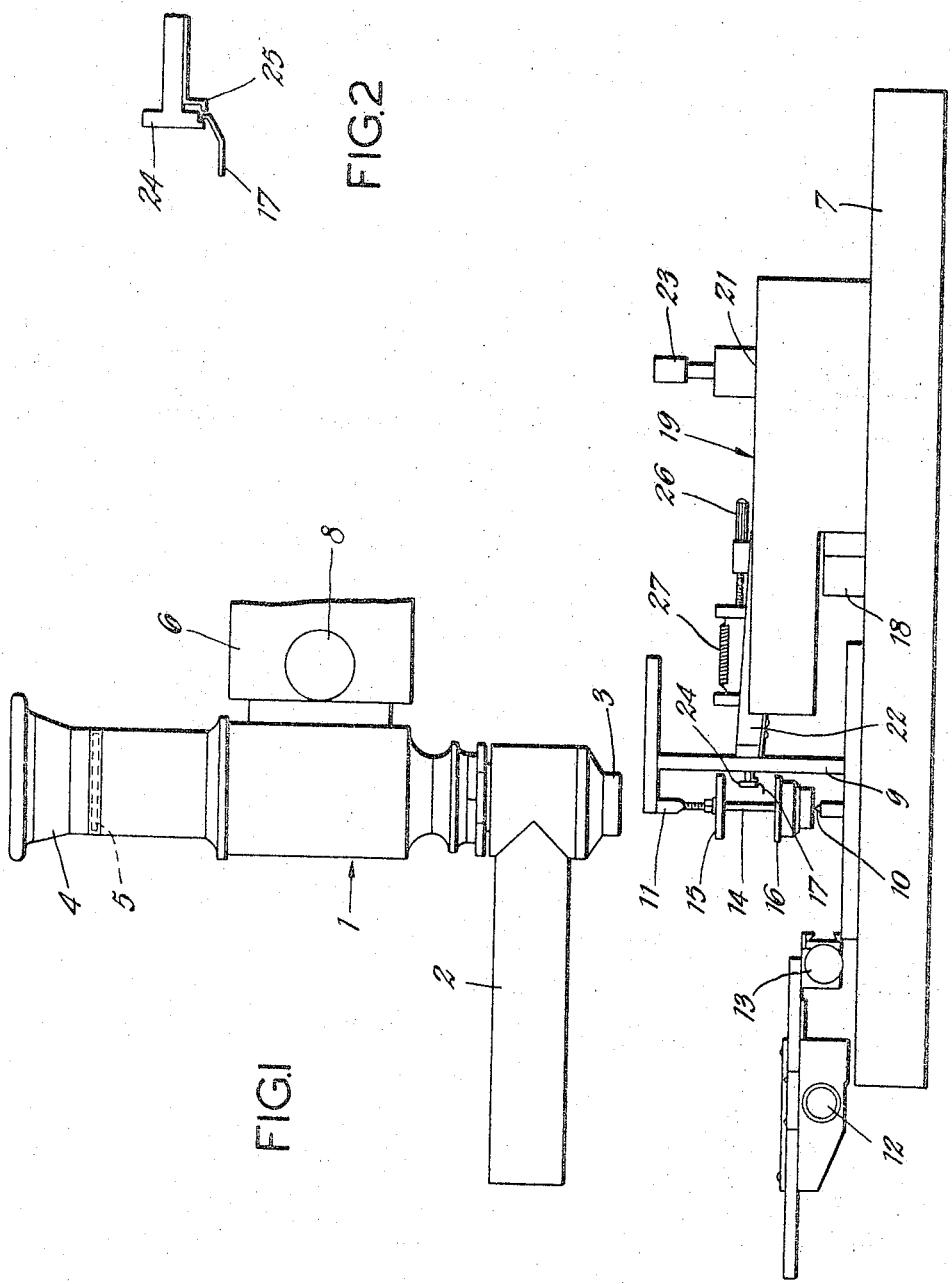

Bernard William Gingell, Carshalton Beeches, and Noel Percival Parkinson, Wembley, England, assignors to Moore Reed and Company Limited
Filed May 28, 1964, Ser. No. 370,896
Claims priority, application Great Britain, May 30, 1963, 21,653/63
10 Claims. (Cl. 29—407)

The invention relates to the mounting of contacts such as wiper contacts in accurate locations upon a support. Such mounting is frequently required in up to three planes during the manufacture of electrical apparatus such as shaft positioning encoders, telemetry switches, data transmitting apparatus and functional switches.

To obtain the accuracy necessary for such apparatus it has heretofore been necessary to manually adjust the position of the contact on the support after mounting. Such adjustment has of necessity to be performed with the aid of a microscope and is difficult and time consuming.

It is an object of the present invention to render such adjustment after mounting unnecessary, and to provide a method of mounting contacts with a position accuracy better than $1/1000$ part of an inch.

The present invention consists in a method of securing a contact at a predetermined position on a support, comprising the steps of positioning said support within the field of view of a magnifying means including a first graticule, positioning said contact between said support and said first graticule in alignment with a marking on said first graticule, positioning a second graticule between said first graticule and the contact in a fixed predetermined relationship to the support, adjusting the position of said second graticule and said support to align said contact with an appropriate marking on said second graticule, locating said contact on said support while in alignment with the markings on said first and second graticules, and securing the contact to the support.

The contact may be temporarily held during alignment by means of a holding tool. Attachment of the contact to the holding tool may be by means of mechanical, electro-magnetic, pneumatic or hydraulic means.

The contact may be secured to the support by any suitable means such as soldering, welding or gluing.

Advantageously the position of the contact on the support is checked after it has been fixed thereto, such a check comprising the steps of refocusing the microscope or magnifying means on the contact after removal of the holding tool.

The magnifying means may comprise a vertically adjustable microscope in the eyepiece of which the first graticule is disposed. Alternatively, the magnifying means may comprise a portion microscope.

Advantageously, position adjusters are provided which allow exact positioning of the second graticule in relation to the first graticule, the positioning of the second graticule corresponding to the particular location required for the contact. Clamping means may be provided for clamping the adjusters when a required position is obtained. Such clamping means of the adjusters may function by electro-magnetic, pneumatic or hydraulic means. The graticules may be of plastics, glass or any suitable material.

Vertical adjusting means are preferably provided on the contact holding tool whereby the contact may be located on the support.

The invention also includes an apparatus for securing a contact at a desired position on a support, comprising in combination a magnifying means, a first graticule included in said magnifying means, means for focussing said magnifying means, means for mounting said support within the field of view of said magnifying means, a second graticule, means for mounting said second graticule in fixed relation to said support and between said means for mounting said support and said first graticule, means for moving said support and said second garticule simuleaneously within said field of view, and means for temporarily holding said contact for movement between said second gradicule and said support and while said contact is secured to said support.

If desired a second magnifying means may be provided at right angles to the first. By use of the second magnifying means and further positioning means, a three dimensional contact aligning system may be provided.

In order to make the invention clearly understood reference will now be made to the accompanying diagrammatic drawings which are given by way of example and in which:

FIG. 1 is an elevational view of an apparatus of the invention; and

FIG. 2 is an enlarged view of a detail of the apparatus.

The illustrated apparatus comprises a microscope 1 which is provided with a vertical ilumination device 2, an objective 3 and eye piece 4, the eye piece 4 being provided with a first graticule 5. The microscope 1 is mounted on an extension 6 of a rigid base plate 7 and is provided with known vertical adjusting means for example a knob 8. Also mounted on the rigid base plate 7 is a frame work 9 which supports a pair of centers 10 and 11 which centers are simultaneously movable in two planes at right angles to each othe r(hereinafter defined as the X and Y planes) by means of micrometers 12 and 13. A carrier 14 is provided which is mounted between the centers 10 and 11 and which carries a second graticule 15 and a support 16 onto which it is required to mount the contacts. The contacts are for instance, wipers such as that shown at 17 and the support 16 a wiper block or like piece of electrical apparatus. The second graticule 15 is made of glass.

The axes between the two centers 10 and 11 and the optical axis of the microscope 1 are both exactly perpendicular to the rigid base plate 7.

Upon the base plate 7 is mounted a member 18 in which a holding tool 19 for the wiper 17 is provided, which can register therewith. The holding tool 19 comprises a base block 21 with a beam 22 which is vertically adjustable by means of a screw 23. On the beam 22 is mounted a sliding member 24 onto which is clamped the tip of the wiper 17 by means of a clamping finger 25 which is movable by a screw 26 against spring means 27. Alternatively, electromagnetic or other suitable clamping means for the wiper may be provided. The holding tool 19 is adjusted so that the tip of the wiper 17 is positioned exactly centrally on the X and Y axes beneath the graticule 5 of the eye piece. The second graticule 15 is then positioned by means of the X and Y position, adjusting micrometers 12 and 13 so that the graticule indication corresponding to the location on the support in which the wiper is to be secured is coincident with the first graticule 5 in the microscope eye piece 4. The whole assembly is then clamped in this position and the wiper 17 is lowered onto the wiper block 16 by means of the vertical adjusting screw 23 on the holding tool 19.

When the wiper 17 is brought into contact with the wiper block 16 it is soldered thereto and then released from the holding tool 19. The tool 19 is then withdrawn and the microscope 1 refocused onto the wiper 17 now on the wiper block surface. Such refocusing enables a chack to be made on whether the wiper 17 is still in its correct position.

The above described process is repeated for each wiper which is to be positioned on the wiper block, the second graticule 15 being rotated as required and the X and Y position adjusting micrometers 12 and 13 also repositioned as necessary.

Modifications of the described process are of course possible. For instance the graticules may be made of synthetic plastics or any suitable material and the contacts may be welded, glued or fixed by any other suitable means to the support when positioned. If desired, a second microscope may be provided at right angles to the first together with an adjustable carrier for the vertical plane. In this way the contact being positioned may be accurately located in a three dimensional system. The magnification of the microscope may be chosen to suit the limit of size and accuracy involved.

Instead of the microscope 1 in which observation is made by means of the eye piece 4, a projection microscope or projection magnifier may be provided, in which the image movement direction is the same as the movement direction of the workpiece. This reduces or eliminates eye strain on the part of the operator and may allow the operator to work from a seated position.

The centres 10 and 11 may be replaced by an oleo type of support mounted on precision bearings of tungsten carbide or diamond.

The clamp formed by the sliding member 24 and the clamping finger 25 may be replaced by a mechanical pressure controlled clamp having clamping tips of tungsten carbide or diamond.

What we claim is:

1. A method of securing a contact at a predetermined position on a support, comprising the steps of positioning said support within the field of view of a magnifying means including a first graticule, positioning said contact between said support and said first graticule in alignment with a marking on said first graticule, positioning a second graticule between said first graticule and the contact in a fixed predetermined relationship to the support, adjusting the position of said second graticule and said support to align said contact with an appropriate marking on said second graticule, locating said contact on said support while in alignment with the markings on said first and second graticules, and securing the contact to the support.

2. A method of securing a contact at a desired position on a support as claimed in claim 1 and comprising the further step of refocussing said magnifying means on said contact to check the positioning thereof when secured.

3. Apparatus for securing a contact at a desired position on a support, comprising in combination a magnifying means, a first graticule included in said magnifying means, means for focussing said magnifying means, means for mounting said support within the field of view of said magnifying means, a second graticule, means for mounting said second graticule in fixed relation to said support and between said means for mounting said support and said first graticule, means for moving said support and said second graticule simultaneously within said field of view, and means for temporarily holding said contact for movement between said second graticule and said support and while said contact is secured to said support.

4. Apparatus as claimed in claim 3, wherein said magnifying means comprises a vertically adjustable microscope having the first graticule disposed in the eyepiece thereof.

5. Apparatus as claimed in claim 3, wherein said magnifying means comprises a projection microscope.

6. Apparatus as claimed in claim 3, and further comprising position adjusters for exact positioning of the second graticule and the support in a predetermined position relative to the contact.

7. Apparatus as claimed in claim 6, and further comprising electro-magnetically operated clamping means for clamping the adjusters in said predetermined position.

8. Apparatus as claimed in claim 6 and for further comprising pneumatically operated clamping means for clamping the adjusters in said predetermined position.

9. Apparatus as claimed in claim 6, and further comprising hydraulically operated clamping means for clamping the adjusters in said predetermined position.

10. Apparatus as claimed in claim 3, wherein said means for temporarily holding said contact comprises electromagnetically actuated clamping means.

References Cited
UNITED STATES PATENTS

| | | | |
|---|---|---|---|
| 2,906,016 | 9/1959 | Cannon et al. | 29—407 |
| 3,061,918 | 11/1962 | Damm | 29—407 |

JOHN F. CAMPBELL, *Primary Examiner.*

THOMAS H. EAGER, *Examiner.*